United States Patent [19]

Takahata et al.

[11] 4,045,614
[45] Aug. 30, 1977

[54] SYSTEM FOR CONTROLLING POLARITY STATE OF START-STOP TELEGRAPH SIGNAL TRAIN

[75] Inventors: Fumio Takahata; Toshio Takahashi; Yasuo Hirata, all of Tokyo, Japan

[73] Assignee: Kokusai Denshin Denwa Kabushiki Kaisha, Japan

[21] Appl. No.: 663,142

[22] Filed: Mar. 2, 1976

[30] Foreign Application Priority Data

July 18, 1975   Japan .................................. 50-88005

[51] Int. Cl.² ............................ H03K 1/17; H04B 1/16
[52] U.S. Cl. ................................. 178/69.1; 178/53.1 R
[58] Field of Search ....................... 178/53.1 R, 53.1 A, 178/69.5 R, 58 R; 328/63; 307/269; 325/320

[56] References Cited

U.S. PATENT DOCUMENTS

| 3,156,767 | 11/1964 | Van Duuren et al. | 178/53.1 R |
|---|---|---|---|
| 3,419,679 | 12/1968 | Elvis et al. | 178/53.1 R |
| 3,678,200 | 7/1972 | Clark | 178/69.5 R |
| 3,916,324 | 10/1975 | Shuda | 178/69.5 R |

Primary Examiner—Thomas A. Robinson
Attorney, Agent, or Firm—Robert E. Burns; Emmanuel J. Lobato; Bruce L. Adams

[57] ABSTRACT

A system for controlling teletype signals, in which a start-stop telegraph signal train may be received at the reversed polarity state. The polarity of a signal element of a received character is decided at a specified instant in a time slot at which the stop element of the received character is expected to arrive. The polarity of a signal element of the received character is again decided in a time slot at which a stop element after a predetermined number of characters from the specified instant is expected to arrive. Only when the polarities of the signal elements of the received characters are decided as the same A-polarity during both of the decision operations, the polarity of the telegraph signal train is automatically reversed.

8 Claims, 16 Drawing Figures

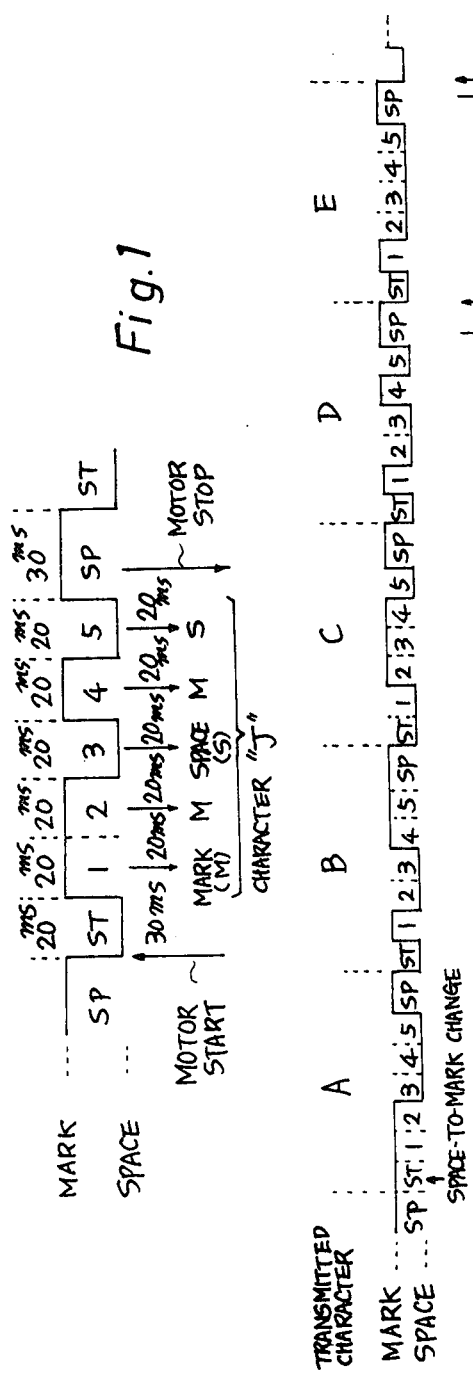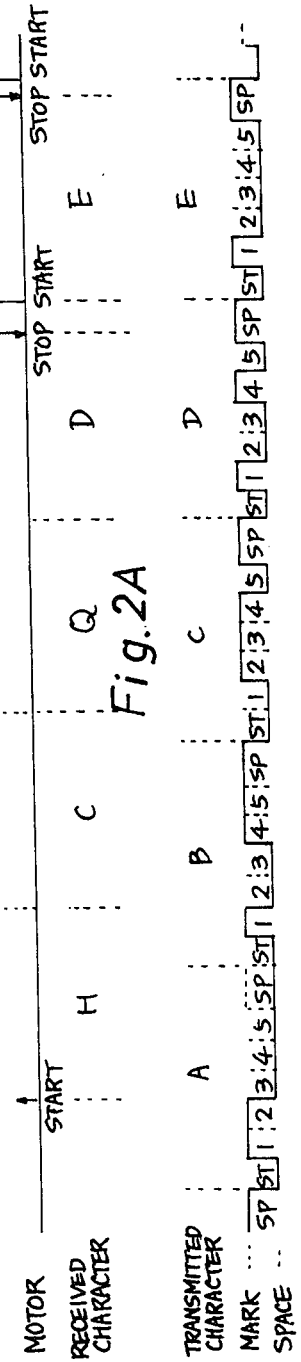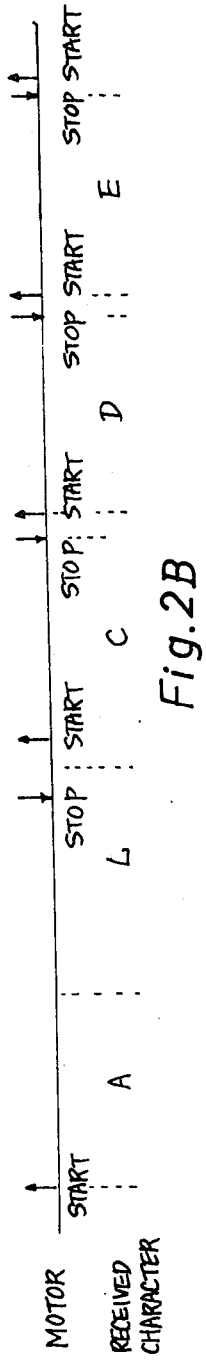

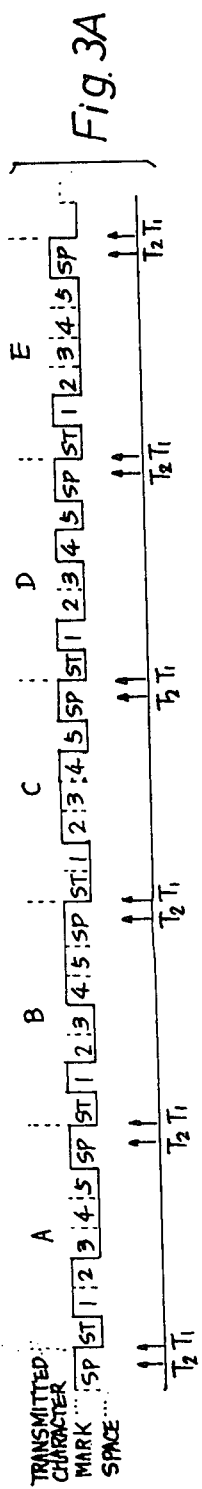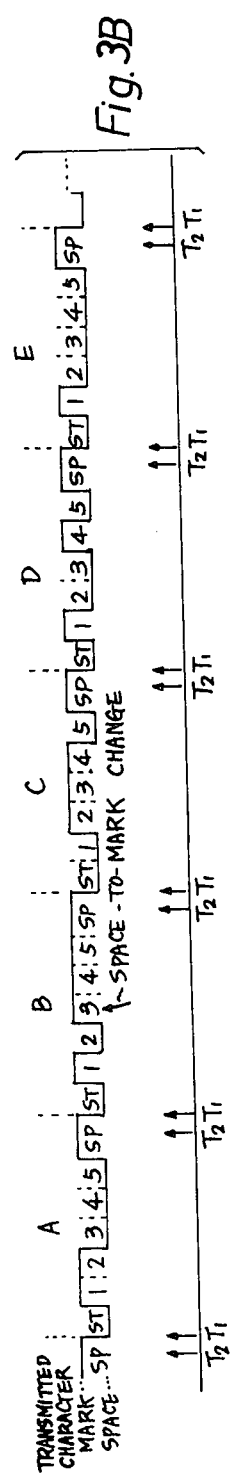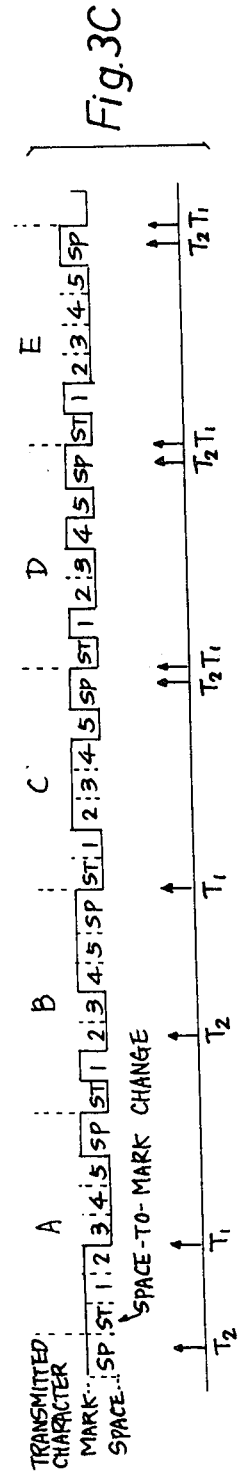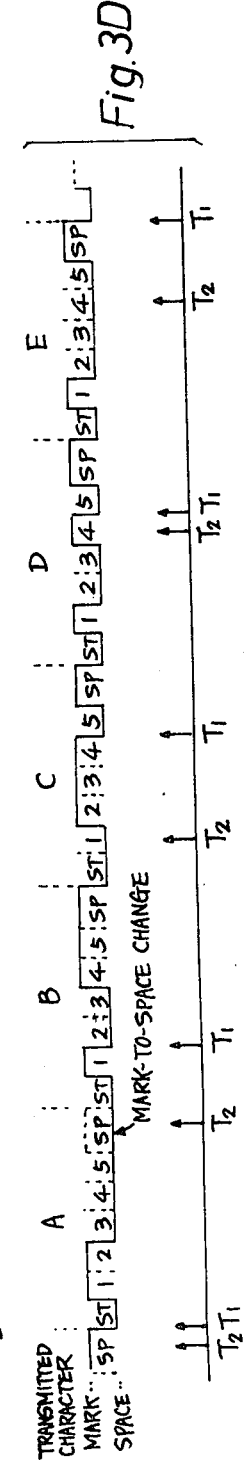

4,045,614

SYSTEM FOR CONTROLLING POLARITY STATE OF START-STOP TELEGRAPH SIGNAL TRAIN

FIELD OF THE INVENTION

This invention relates to a system for controlling the polarity state of a start-stop telegraph signal train.

BRIEF DESCRIPTION OF THE PRIOR ART

The start-stop telegraph signal has been heretofore employed in Teletype communication. This start-stop telegraph signal is such a signal that a start element and a stop element for the start-stop timing are respectively added before and after a set of several information elements of each character, by which the teletypewriter is caused to repeatedly start and stop to perform its printing operation of each character. For example, a character of a 7.5-unit start-stop 50-bauds telegraph signal employed in the international Teletype communication channels has a configuration such that the start element (hereinafter referred to as an ST element) has a space polarity (A-polarity) of 20 milli-seconds (ms) duration and the stop element (hereinafter referred to as an SP element) has a mark polarity (Z-polarity) of 30 ms duration while five information elements 1 to 5 each having a 20 ms duration are inserted between the ST element and the SP element. Accordingly, a character of the 7.5-unit start-stop 50-baud telegraph signal has a duration of 150 ms.

Since the start-stop telegraph signal has such a special configuration that the ST element is the space polarity of 20 ms duration and that the SP element is the mark polarity of 30 ms duration, it has an automatic start-stop synchronization recovery function whereby the normal operation is recovered after several consecutive erroneous characters.

However, in case of transmitting the start-stop telegraph signal train modulated by phase-shift-keying (hereinafter referred to PSK), the space polarity and the mark polarity are sometimes reversed to each other due to a phase ambiguity of an input PSK wave in a demodulator at the receiving side so that the start-stop telegraph signal train with the reversed polarity is applied to the teletypewriter. In such a case, the automatic start-stop timing recovery described above does not occur and erroneous letters are endlessly printed by the teletypewriter.

BRIEF SUMMARY OF THE INVENTION

An object of this invention is to provide a system for controlling the polarity state of a start-stop telegraph signal, which system can automatically detect the polarity reversal of the start-stop telegraph signal train due to the noise in the transmission line, and which system can prevent consecutive erroneous letters due to the polarity reversal from being printed by a teletypewriter.

Another object of this invention is to provide a system for controlling the polarity state of a start-stop telegraph signal, which system prevent consecutive erroneous letters from being printed by a teletypewriter under no disturbance by loss of start-stop synchronization.

To attain the above object of this invention, there is provided a system for controlling start-stop Teletype signals, in which a start-stop telegraph signal train may be received at the reversed polarity state. In accordance with this invention, the polarity of a signal element of a received character is decided at a specified instant in a time slot at which the stop element of the received character is expected to arrive. The polarity of a signal element of the received character is again decided in a time slot at which a stop element after a predetermined number of characters from the specified instant is expected to arrive. Only when the polarities of the signal elements of the received characters are decided as the same A-polarity in the the above two decision operations, the polarity of the telegraph signal train is automatically reversed.

In a system of this invention for controlling the polarity state of a start-stop telegraph signal train, input terminal means is provided for receiving the start-stop telegraph signal train. Switch means is connected to the input terminal means for controlling so as to reverse the polarity state of the start-stop telegraph signal train in response to a control input thereof. Output terminal means is connected to the output of the switch means for sending out the controlled start-stop telegraph signal train having the correct polarity state. Timing means is connected to the output of the switch means for generating first timing pulses and second timing pulses. Each of the first timing pulses is included in a time slot at which the stop element of a character of the start-stop telegraph signal train is expected to arrive. At least one of the second timing pulses is included in a time slot at which a stop element after a predetermined number of characters from the first timing pulse is expected to arrive. Decision means is connected to the output of the switch means and the timing means for deciding the polarities of signal elements of the start-stop telegraph signal train in synchronism with the first timing pulse and the second timing pulse respectively. Control means is connected to the decision means and the switch means for generating the control input of the switch means only when the polarities of the signal elements of the start-stop telegraph signal train are decided as the same A-polarity in the two decision operations by the decision means. Each of the second timing pulses can be selected from the first timing pulses. The decision means may perform the selection operation only when the decision means decides the A-polarity of a stop element in response to one of the first timing pulses. The decision means may further comprise means for inhibiting the decision operation during a predetermined period after the decision means decides the A-polarity of a stop element in response to one of the first timing means.

BRIEF DESCRIPTION OF THE DRAWINGS

The objects, principle, construction and operation of this invention will be clearly understood from the following detailed description taken in conjunction with the accompanying drawings, in which:

FIG. 1 is a signal train diagram showing a configuration of a start-stop telegraph signal to which this invention is applied;

FIGS. 2A and 2B are time charts explanatory of the manner of causing erroneous letters by a teletypewriter;

FIGS. 3A, 3B, 3C, 3D and 4 are time charts explanatory of the principle of this invention;

DETAILED DESCRIPTION OF THE INVENTION

Figure 4:
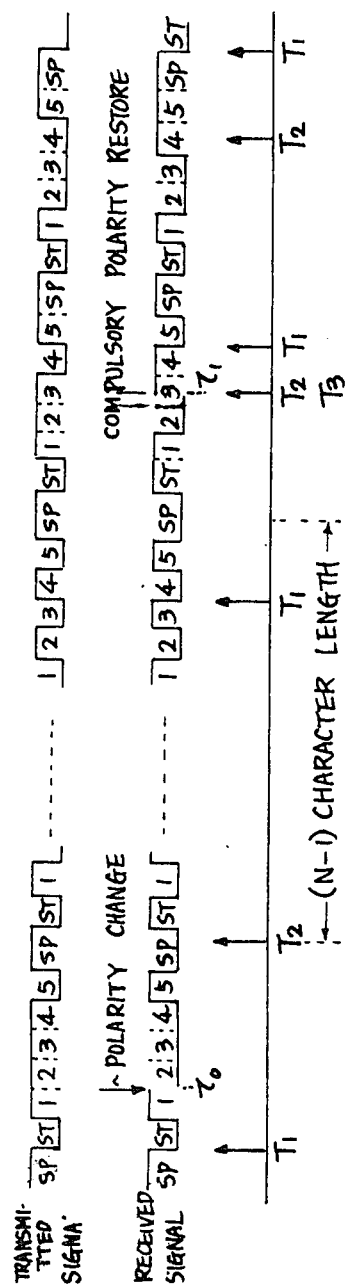

For readily understanding this invention, the configuration of the start-stop telegraph signal and the manner of causing erroneous letters by a teletypewriter will first be described. When a teletypewriter on the receiving side is supplied with such a Teletype signal as shown in FIG. 1, it performs the following operations. That is, when such a Teletype signal is supplied to the teletypewriter, the motor of the teletypewriter is started at the transition instant from the mark polarity of the SP element to the space polarity of the ST element, and the teletypewriter decides the polarities of information elements at the respective intervals of 30 ms, 20 ms, 20 ms and 20 ms after the start of the motor, so that one letter is thus printed in accordance with the resulting combination of the polarities decided. After a period of 20 ms, the polarity is further decided and, if the decided result is the mark polarity, the motor is stopped for the next operation. This is the start-stop synchronization in a start-stop Teletype communication.

In some cases, the Teletype signals with the reversed polarities of the elements forming each character are applied to the teletypewriter when disturbed by the noise in the transmission line. In case of the information element polarities being reversed, only one letter becomes erroneous as understood from the above start-stop synchronization. However, in case of the ST element polarity being reversed to mark or of the SP element polarity being reversed to space, the teletypewriter operates in a such a manner as shown in FIG. 2 and prints consecutive erroneous letters. (As shown in FIG. 2B, sometimes only one character becomes erroneous according to the combination of characters). Namely, as shown in FIG. 2A, if the ST element polarity of a character A is reversed to mark, the first and second information elements of the character A are regarded as the SP element of the preceding character and the third element of the space polarity is regarded as the ST element so that the motor of the teletypewriter starts at the transition instant by the third element. Accordingly, the start-stop synchronization for receiving the character A will be disturbed (called "loss of start-stop synchronization"), but the normal operation recovers after several erroneous characters H, C and Q. (This phenomenon is called automatic start-stop synchronization recovery.) Accordingly, erroneous letters are continuously printed by the typewriter during the loss of the start-stop synchronization. In the case of FIG. 2B, if the SP element polarity of the character A is reversed to space, the teletypewriter prints the letter A with the normal operation, but misprints the letter L instead of the letter B, regarding the ST element of the character B as the first element of the next character and the following four elements as the information elements. Since the fifth element of the character B has the same polarity as the SP element, it is regarded as one part of the SP element, and the motor of the teletypewriter once stops and the normal operation is performed from the ST element of the next character C.

For convenience, timings $T_1$, $T_2$ and $T_3$ are defined as follows:

1. Mark-to-space transition timing $T_1$ (Refer to FIG. 3)

This is the first transition instant of the input Teletype signal train to the teletypewriter from the mark polarity to the space polarity at the beginning of the communication. During communication, this is the first transition instant of the signal train from the mark polarity to the space polarity after each mark-space decision timing $T_2$ (described later).

2. Mark-space decision timing $T_2$ (Refer to FIG. 3)

Each timing $T_2$ is an instant of 140 ms after the mark-to-space transition timing $T_1$, in the case of using a 7.5-unit start-stop 50 bands telegraph signal. At this timing, it is decided whether the polarity of the input Teletype signal train applied to the teletypewriter is mark or space.

3. Compulsory mark-space reversal timing $T_3$ (Refer to FIG. 4)

If the polarity of the input Teletype signal train is decided to be space at the mark-space decision timing $T_2$ and again decided to be space at the mark-space decision timing $T_2$ in the period from $(N-1) \times 150$ ms (i.e. $(N-1)$ characters) to $(N + M) \times 150$ ms (i.e. $(N+M)$ characters) after the former timing $T_2$, the mark and space polarities of the input Teletype signal train applied to the teletypewriter are compulsorily reversed. In this case, each of the above N and M is an integer. This compulsory markspace reversal timing is hereinbelow referred to as $T_3$.

The principles of the operation of this invention will be explained by the above-defined timings.

The input Teletype signal train applied to the teletypewriter is supervised and it is always decided whether the polarity of the signal train at each timing $T_2$ is space or mark. In case of the polarity being decided as space, the polarity decision at the timings $T_2$ during $(N-1) \times 150$ ms after then is once stopped and the polarity decision at $T_2$ in the period from $(N-1) \times 150$ ms to $N+M) \times 150$ ms is again performed. If the polarity is decided as space during this deciding operation, the mark and space polarities of the Teletype signal train after the space polarity decision are compulsorily reversed so that the Teletype signal train having the correct polarity state is applied to the teletypewriter.

In a case where the polarity of the received signal train is decided to be space at the timing $T_2$ due to loss of start-stop synchronization, the automatic start-stop synchronization recovery can be expected to take place during the immediately succeeding $(N-1) \times 150$ ms. Namely, if the value of N is selected so that the probability of the automatic start-stop synchronization recovery may be sufficiently high, the probability of erroneous compulsory reversal in case of loss of start-stop synchronization is much lessened. Accordingly, if the polarity is decided to be space at the timing $T_2$ in the period from $(N-1) \times 150$ ms to $(N+M) \times 150$ ms, the decision of space is not regarded as loss of start-stop synchronization but as the polarity reversal of the received Teletype signal train. Accordingly, since the input Teletype signal train applied to the teletypewriter is compulsorily reversed, the polarity of the signal train is restored to the correct polarity state and consecutive erroneous letters can be prevented from being printed by the teletypewriter.

Next, the operation of controlling signals applied to the teletypewriter will be explained by the following concrete examples.

i. In a case where the start-stop telegraph signal train is received at the correct polarity state:

For example, as shown in FIG. 3A, the timing $T_2$ falls always in the period of the SP element and the polarity of the signal train is decided to be mark at this timing, and the signal train is supplied to the teletypewriter, so that no erroneous letter is printed.

ii. In a case where the mark polarity of the information element is received as the space polarity:

For example, as shown in FIG. 3B, the timing $T_2$ falls always in the period of the SP element and the polarity is decided to be mark at this timing. Accordingly, the Teletype signal train is not regarded as the polarity-reversed signal train and is applied to the teletypewriter, therefore one erroneous character is printed.

iii. In a case where the space polarity of the ST element is received as the mark polarity:

For example, as shown in FIG. 3C, the timing $T_1$ is restored to be normal from the third character, so that the Teletype signal train is not regarded as the polarity-reversed signal train and is applied to the teletypewriter. Therefore, after several erroneous letters are printed, the start-stop timing is recovered automatically.

iv. In a case where the mark polarity of the SP element is received as the space polarity:

For example, as shown in FIG. 3D, the timing $T_1$ is restored to be normal from the fifth character, so that the Teletype signal train is not regarded as the polarity-reversed signal train like the case (iii) and is applied to the teletypewriter. Therefore, after several erroneous letters are printed, the start-stop synchronization is automatically recovered.

v. In a case where the polarity of the Teletype signal train is received at the reversed polarity.

For example, when the signal train is received in the reversed polarity at the timing $T_0$ shown in FIG. 4, more than N characters become erroneous. However, if the polarity of the signal train is decided to be space at the timing $T_2$ (at the timing $\tau_1$ in FIG. 4) in the period from $(N-1) \times 150$ ms to $(N+M) \times 150$ ms after the timing $\tau_0$, the signal train is regarded as the polarity-reversed signal train and the polarity of the signal train is compulsorily reversed. Therefore, since the signal train is applied to the teletypewriter, the start-stop timing is automatically recovered after several erroneous letters are further printed.

The values of N and M are selected optimum in consideration of the element error rate in the transmission line and the probability of the polarity reversal of the signal train due to the phase ambiguity of the input PSK wave in the demodulator on the receiving side. According to the result of a calculation, in the case where the element error rate is $10^{-5}$ and the probability of the polarity reversal due to the phase ambiguity in the demodulator is $10^{-7}$, it is optimum that $N=10$ and $M=10$.

Figure 5:
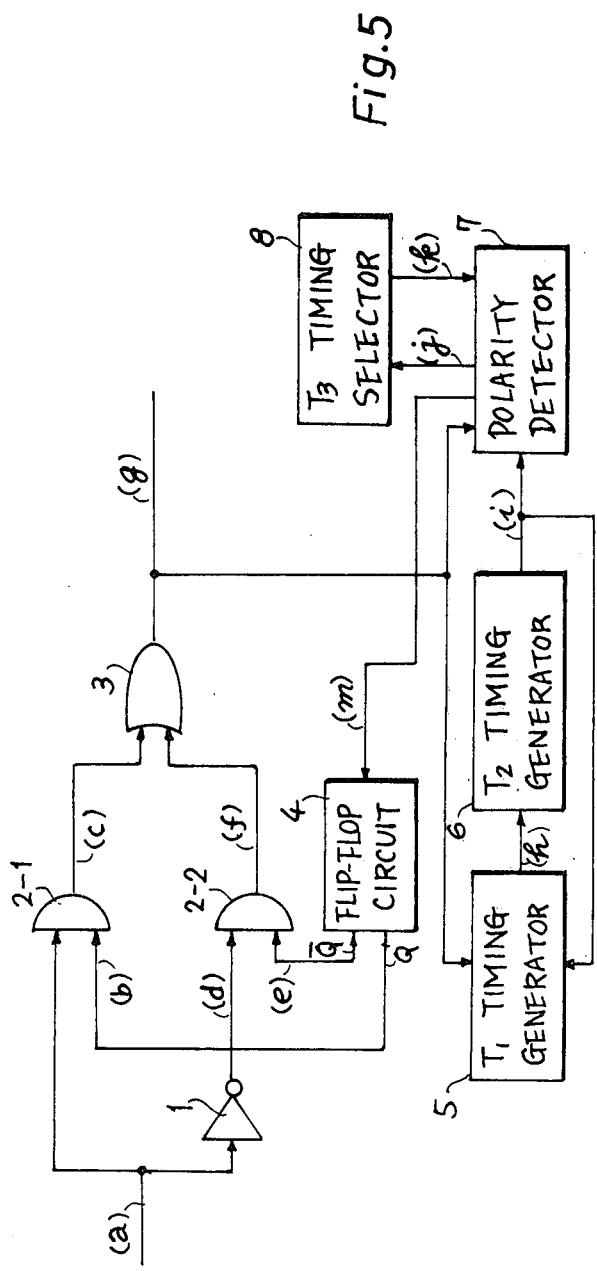
FIG. 5 is a block diagram illustrating an embodiment of this invention.

With reference to FIG. 5, an embodiment of this invention will be described. In FIG. 5, reference numeral 1 denotes an inverter; 2-1 and 2-2 AND circuits; 3 an OR circuit; and 4 a T flip-flop circuit. A $T_1$ timing generator generates pulses (h) at the timing $T_1$ by the use of the outputs of the OR circuit 3 and of a $T_2$ timing generator described below. The $T_2$ timing generator 6 generates pulses (i) at the timing $T_2$ in response to the output (h) of the $T_1$ timing generator. A polarity detector 7 detects the polarities of signal elements of the output (g) of the OR circuit 3 at the timing $T_2$ of the pulses (i). A $T_3$ timing selector 8 selects pulses indicative of the timing $T_2$ from the pulses (i) of the timing $T_2$ in consideration of the detection result of the polarity detector. The circuits 5, 6, 7 and 8 are formed by AND circuits, OR circuits, Flip-Flop circuit and like circuits as described below.

Figure 6:
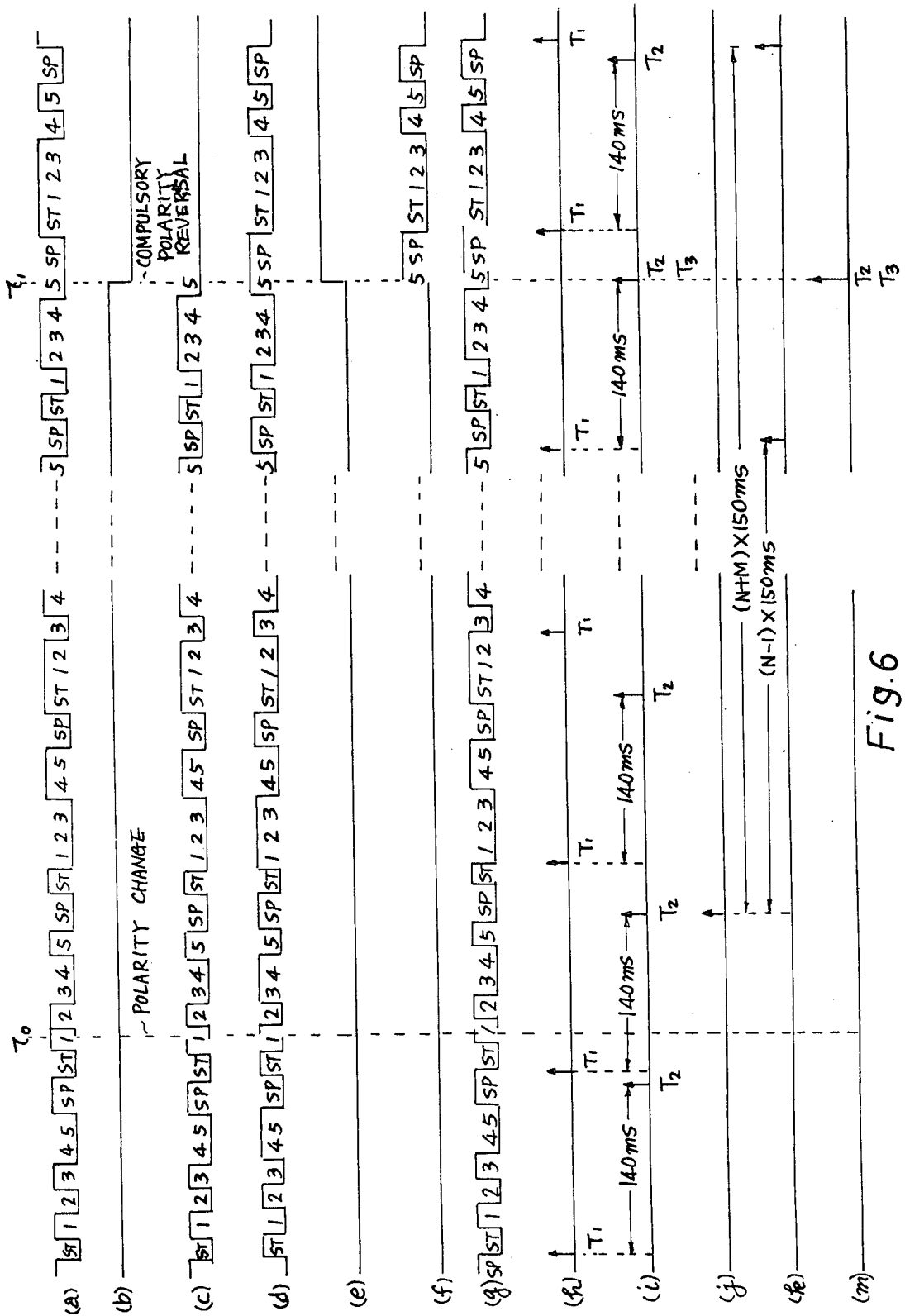
FIG. 6 shows time charts explanatory of the operation of the embodiment shown in FIG. 5.

Let it be assumed as an initial setting that such a signal train as shown in FIG. 6 (a) is the input (received in the reversed polarity at the timing $\tau_0$) and that the output Q from the T flip-flop circuit 4 is such a signal as shown in FIG. 6 (b). In such a case, the output from the AND circuit 2-1 is an AND logic of the signals (a) and (b), and hence becomes (c). On the other hand, the output from the inverter circuit 1 becomes (d) which is a reversal of the signal (b). Accordingly, the output from the AND circuit 2—2 is an AND logic of the signals (d) and (e), and hence becomes (f). Next, the output from the OR circuit 3, i.e. the signal train applied to the teletypewriter, is supervised and, only when it is decided to be the polarity-reversed signal train, its polarity is compulsorily reversed.

The detailed description will be given about the operations of deciding whether the signal train is polarity-reversed or not and of compulsorily reversing the polarity.

When supplied with the $T_2$ pulse (i) from the $T_2$ timing generator 6 as described later, the $T_1$ timing generator 5 detects the first mark-to-space polarity transition instant $T_1$ of the signal train (g) after the mark-space decision timing $T_2$ and generates the $T_1$ pulse (h). The $T_2$ timing generator 6 generates the $T_2$ pulse (i) in response to the $T_1$ pulse (h) from the circuit 5, at the timing $T_2$, i.e. 140 ms after the $T_1$ pulse (h). Now, which of circuits 5 and 6 generates the pulses earlier can be seen by considering the beginning of the communication. That is, assuming that the mark-signal with the mark polarity in the period of more than several characters' length is transmitted from the transmitting side at the beginning of the communication, the mark-signal is received at the mark polarity at the receiving side, therefore the first mark-to-space transition timing $T_1$ is known so that the timing $T_2$ is also known. In such a manner, the timings $T_1$ and $T_2$ are sequentially determined in the order $T_1$-$T_2$-$T_1$-$T_2$ . . . . In synchronism with the $T_2$ pulse (i) from the circuit 6, the polarity detector 7 decides the polarity of a signal train (g) supplied to the teletypewriter and only when the polarity of the signal train (g) is decided to be space, the detector 7 generates the pulse (j) and applies it to the $T_3$ timing selector 8. However, the supply of the pulse (i) to the circuit 8 is inhibited until the second pulse ($K_2$) (described later) is supplied from the circuit 8 or the pulse (m) (described later) is supplied to the T flip-flop circuit 4. Further, if the polarity of the signal train (g) is decided to be space in the time interval between the first pulse ($k_1$) (described later) and the second pulse ($K_2$) from the circuit 8, only one pulse (m) is applied to the T flip-flop circuit 4. The T timing selector 8 generates first and second pulses (k) in response to the pulse (j) from the detector 7 at two predetermined timings, i.e. at respective timings $(N-1) \times 150$ ms and $(N+M) \times 150$ ms after the supply of the pulse ($j$) from the circuit 7, and the first ($K_1$) and second ($K_2$) pulses generated are applied to the polarity detector 7. As previously described, if the polarity of the signal train ($g$) applied to the teletypewriter is decided to be space at the instant $T_2$ in the time interval between the two pulses, the polarity detector 7 applies a pulse ($m$) to the T flip-flop circuit 4 at the above polarity decision timing $T_2$. At the timing $\tau_1$ when the T flip-flop circuit 4 is supplied with the pulse ($m$), its outputs Q and $\overline{Q}$ are reversed as shown in ($b$) and ($e$). When these outputs are applied to the AND circuits 2-1 and 2-2, the outputs from the AND circuits 2-1 and 2-2 respectively become such as shown in ($c$) and ($f$) and are applied to the OR circuit 3, whereby the polarity of the input signal train ($g$) to the teletypewriter is reversed at the timing $\tau_1$ as shown in ($g$).

Figure 7:
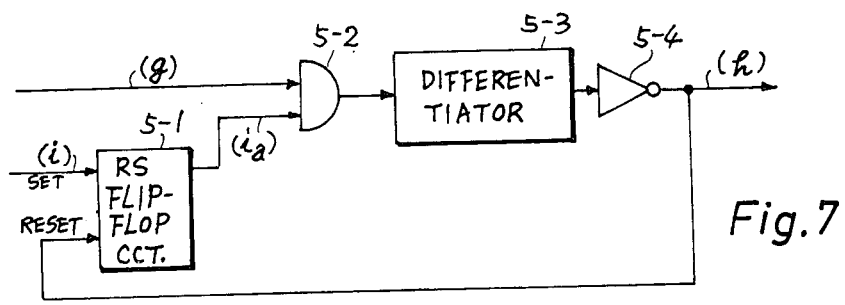
FIG. 7 is a block diagram illustrating an example of a $T_1$ timing generator employed in the embodiment shown in FIG. 5.
Figure 8:
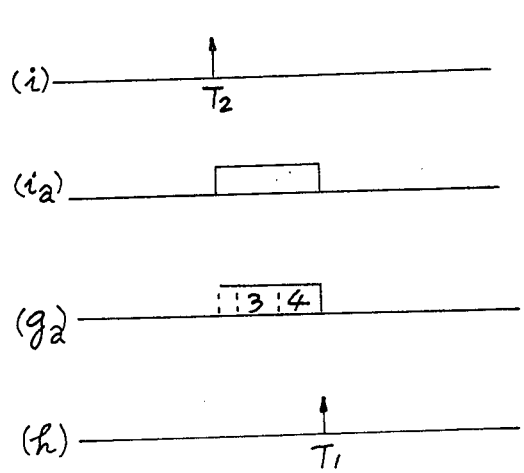
FIG. 8 shows time charts explanatory of the operation of the example shown in FIG. 7.

With reference to FIGS. 7 and 8, an example of the $T_1$ timing generator 7 will be described. An RS flip-flop circuit 5-1 is initially established to the reset state. When a pulse $T_2$ shown by ($i$) in FIG. 8 is applied to the RS flip-flop circuit 5-1, an output ($i_a$) is obtained at the output of the flip-flop circuit 5-1. This flip-flop circuit assumes the high output and the low output at the set state and the reset state thereof, respectively. The output ($i_a$) is applied to an AND circuit 5-2, which produces an AND logic output ($g_2$) of the two inputs ($g$) and ($i_a$) to apply the same to a differentiator 5-3. The differentiator 5-3 generates two pulses of plus and minus polarities at the rise instant and the termination instant of the output ($i_a$), respectively. Only the latter one of the two pulses becomes a $T_1$ pulse ($h$) of plus polarity at the output of an inverter 5-4 and resets the RS flip-flop circuit 5-1.

Figure 9:
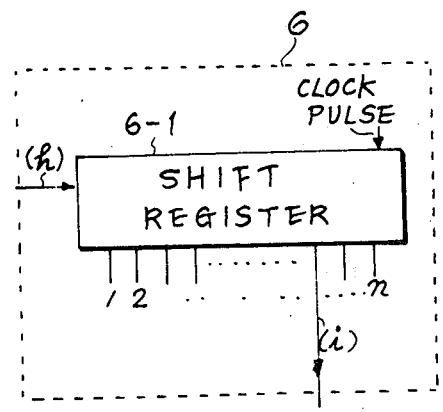
FIG. 9 is a block diagram illustrating an example of a $T_2$ timing generator employed in the embodiment shown in FIG. 5.

An example of the $T_2$ timing generator 6 is a shift register 6-1 shown in FIG. 9, which shifts the pulse ($h$) in synchronism with clock pulses applied to a terminal 6-2 from a pulse generator not shown. The repetition cycles of the clock pulses and the number of stages of the register 6-1 are determined so that the $T_2$ pulse ($i$) is delayed by a period of 130 ms from the $T_1$ pulse ($h$).

Figure 10:
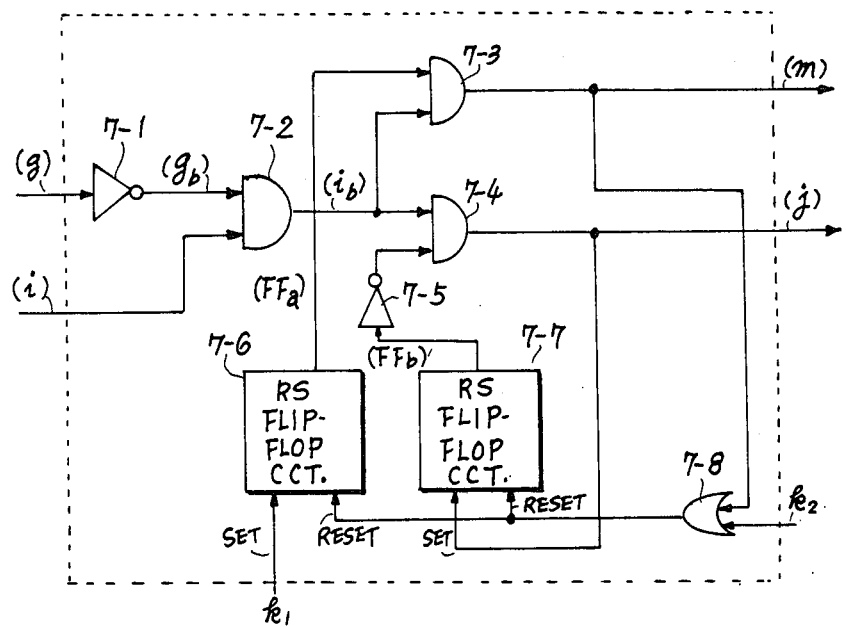
FIG. 10 is a block diagram illustrating an example of a polarity detector employed in the embodiment shown in FIG. 5.
Figure 11:
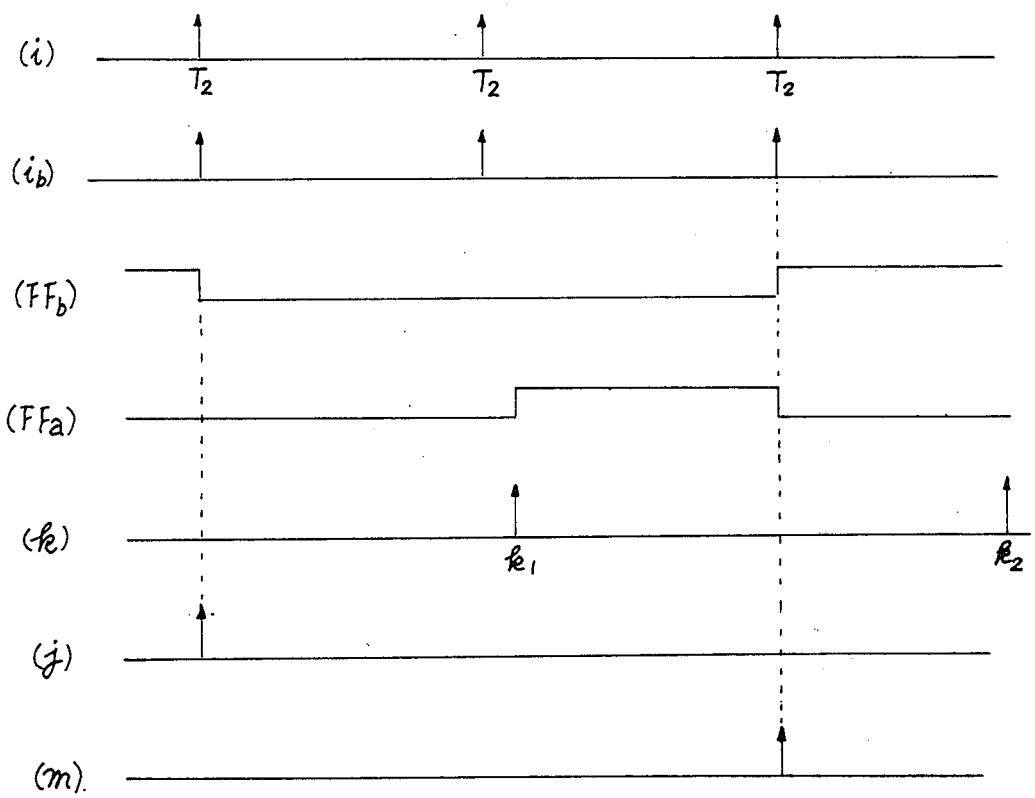
FIG. 11 shows time-charts explanatory of the operation of the example shown in FIG. 10.

With reference to FIGS. 10 and 11, an example of the polarity detector will be described. The start-stop telegraph signal ($g$) is applied as a signal ($g_b$) through an inverter 7-1 to an input of an AND circuit 7-2, while a $T_2$ pulse ($i$) is applied to the other input of the AND circuit 7-2. Accordingly, the polarity of a signal element of the telegraph signal ($g_b$) is detected at the AND circuit 7-2 in synchronism with the $T_2$ pulse ($i$), so that a pulse ($i_b$) is obtained at the output of the AND circuit 7-2 when the detected signal element of the telegraph signal ($g$) has the space polarity (i.e. the A-polarity). In this case, since an RS flip-flop circuit 7-7 is reset so that an inverter 7-5 generates an output FF$b$ of high level to an AND circuit 7-4, the pulse ($i_b$) passes through the opened AND circuit 7-4 and becomes an output pulse ($j$). This output pulse ($j$) sets the RS flip-flop circuit 7-7, so that the AND circuit 7-4 is closed. An RS flip-flop circuit 7-6 is established to the set state in response the first pulse ($K_1$) from the $T_3$ timing selector, so that an AND circuit 7-3 is opened by the output FF$a$ of high level from the RS flip-flop circuit 7-6. Accordingly, when the pulse ($i_b$) is thereafter applied to the AND circuit 7-3, the AND circuit 7-3 produces a pulse ($m$) to apply the same to the T flip-flop circuit 4 as mentioned above. This pulse ($m$) resets the RS flip-flop circuits 7-6 and 7-7. If the pulse ($m$) is not obtained, the second pulse ($k_2$) applied through an OR circuit 7-8 resets the RS flip-flop circuit 7-6 and 7—7.

Figure 12:
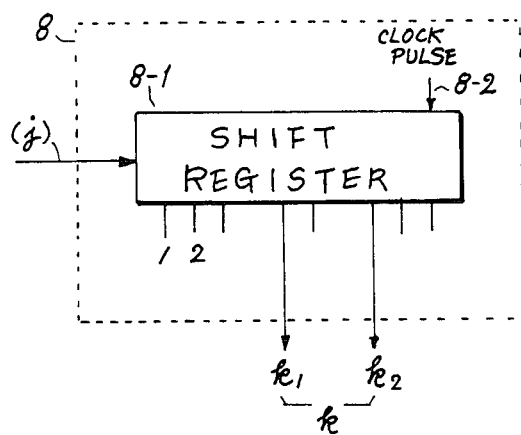
FIG. 12 is a block diagram illustrating an example of a $T_3$ timing generator employed in the embodiment shown in FIG. 5.

An example of the $T_3$ timing selector 8 is a shift register 8-1 shown in FIG. 12, which shifts the pulse ($j$) in synchronism with clock pulses applied to a terminal 8-2 from a pulse generator now shown. The repetition cycles of the clock pulses and the number of stages of the register 8-1 are determined so that each of the pulses $k_1$ and $k_2$ are successively delayed by a period of a predetermined number of characters from the pulse ($j$) or the first pulse $k_1$.

As has been described in detail in the foregoing, this invention is to provide a Teletype signal control system which detects the polarity reversal of a start-stop telegraph signal train on the receiving side and prevents consecutive erroneous letters due to the polarity reversal from being printed by the teletypewriter. The use of this circuit has such an advantage of enabling the transmission of a start-stop telegraph signal train modulated by PSK, FSK or ON-OFF Keying under an extremely improved element error rate.

What we claim is:

1. A system for controlling the polarity states of a start-stop telegraph signal train comprising:
   input terminal means for receiving said start-stop telegraph signal train;
   switch means connected to said input terminal means for reversing the polarity state of said start-stop telegraph signal train in response to a control input signal applied thereto;
   output terminal means connected to receive the output of said switch means for sending out said controlled start-stop telegraph signal train having the correct polarity state;
   timing means connected to receive the output of said switch means for generating first timing pulses and second timing pulses, each of said first timing pulses being included in a time slot at which the stop element of a character of said start-stop telegraph signal train is expected to arrive, at least one of said second timing pulses being included in a time slot at which a stop element after a predetermined number of characters from said first timing pulse is expected to arrive;
   decision means connected to receive said output of said switch means and said timing means for deciding the polarities of signal elements of said start-stop telegraph signal train in synchronism with said first timing pulse and said second timing pulse respectively; and
   control means connected to said decision means and said switch means for generating said control input signal and for applying it to said switch means only when the polarities of said signal elements of said start-stop telegraph signal train are decided as the A-polarity during both the decision operations by said decision means.

2. A system according to claim 1, in which said timing means comprises first timing means connected to the output of said switch means for generating the first timing pulses, and second timing means operatively coupled to said first timing means for selecting said second timing pulse from said first timing pulses.

3. A system according to claim 2, in which said timing means includes means connecting said second timing means to said decision means for performing said selection operations of one of said second timing pulses only when said decision means decides the A-polarity of a stop element in response to one of said first timing pulses.

4. A system according to claim 1, in which said decision means includes means for inhibiting the decision operation during a predetermined period after said decision means decides the A-polarity of a stop element in response to one of said first timing pulses.

5. A system according to claim 2, in which said first timing generator comprises an AND circuit having an input for receiving the output of said switch means, a RS flip-flop circuit set by the first pulses from said timing means and generating an output applied to the other input of said AND circuit, a differentiator connected to the output of said AND circuit, and an inverter for producing a mark-to-space transition pulse, and said RS flip-flop circuit is reset by the mark-to-space transition pulse.

6. A system according to claim 5, in which said first timing generator further comprises a shift register for shifting said mark-to-space transition pulse to obtain said first timing pulse.

7. A system according to claim 4, in which said decision means comprises an inverter receiving the output of said switch means, a first AND circuit receiving at one of two inputs thereof the output of said inverter and at the other of two input thereof the first timing pulses, a second AND circuit having an input receiving the output of said first AND circuit and producing said control input signal applied to said switch means, a third AND circuit having an input receiving said output of said first AND circuit to produce at the output thereof an A-polarity detection pulse, a first RS flip-flop circuit set by the first one of said second timing pulses and reset by the second one of said second timing pulses so that the output of the first flip-flop circuit is applied to the other input of said second AND circuit, a second RS flip-flop circuit reset by the second one of the second timing pulses and set by the output of said third AND circuit, and an inverter inserted between the output of the second RS flip-flop circuit and the other input of said third AND circuit.

8. A system according to claim 7, in which said second timing generator comprises a shift register for shifting said A-polarity detection pulse to obtain said second timing pulses.

* * * * *